US006964371B2

(12) United States Patent

Huang et al.

(10) Patent No.: US 6,964,371 B2

(45) Date of Patent: Nov. 15, 2005

(54) ELECTRONIC DISPLAY

(75) Inventors: Chun-hui Huang, Hsinchu (TW); Chih-Lung Liu, Hsinchu (TW)

(73) Assignee: Atop Technologies Inc., Hsinchu (TW)

( * ) Notice: Subject to any disclaimer, the term of this patent is extended or adjusted under 35 U.S.C. 154(b) by 209 days.

(21) Appl. No.: 10/428,115

(22) Filed: May 2, 2003

(65) Prior Publication Data

US 2004/0217167 A1 Nov. 4, 2004

(51) Int. Cl.[7] .............................................. G06K 15/00

(52) U.S. Cl. ...................... 235/383; 235/383; 439/110; 439/121

(58) Field of Search ........................ 235/383; 439/110, 439/121, 94; 340/815.2, 815.01

(56) References Cited

U.S. PATENT DOCUMENTS 5,049,870 A * 9/1991 Fitzgerald et al. ..... 340/815.55
5,348,485 A * 9/1994 Briechle et al. ............ 439/110
6,418,651 B1 * 7/2002 Joliey ....................... 40/642.02
6,435,884 B1 * 8/2002 Tada .......................... 439/110

* cited by examiner

*Primary Examiner*—Steven S. Paik

(74) *Attorney, Agent, or Firm*—Rosenberg, Klein & Lee

(57) ABSTRACT

An electronic display comprises a transversally U-shaped fixing beam with a two-wired conducting strip installed therein. Two terminal-fixing bases to fix the two-wired conducting strip and connected electric cables are provided at both ends of the two-wired conducting strip, respectively. Two magnetic connectors are disposed at the back side of each display corresponding to the two-wired conducting strip, when the display is disposed on the fixing beam the electric connection is achieved through magnetically adhesive contact of the magnetic connectors with the two-wired conducting strip. The invention has the advantage of simple installation and flexible positioning.

8 Claims, 7 Drawing Sheets

ELECTRONIC DISPLAY

FIELD OF THE INVENTION

The present invention relates to an electronic display used on product shelves to facilitate the stocking process.

BACKGROUND OF THE INVENTION

With continuing development and progress in science and technology, the life style of human being has gradually changed to faster, simpler and more convenient to save time and energy, commercial goods centers emerge accordingly. Stocking is an essential operating process within the center, the process mainly relies on comparing the charts while the process goes on. The efficiency and error rate of this traditional way of stocking depends on the individual's working attitude and spirit, therefore improving efficiency and decreasing error rate is hard to achieve. However electronic display networking with PC can replace the conventional process seamlessly with the signals and digital displays on the electronic display, the computer controls and guides the employees through this paperless stocking process accurately, quickly and easily.

As shown in FIG. 1, a conventional electronic display 10 on a shelf comprises a flat cable 14 composed of several transmission lines 12. A plurality of positions for installing electronic displays 24 are marked on the flat or ribbon cable 14 so that multiple connection bases 16 can be set at predetermined positions of the flat cable 14. Multiple insertion slots 18 are disposed on the surface of each connection base 16. The flat cable 14 is installed in a transversally U-shaped frame 20, as shown in FIG. 2. Contacts (not shown) of each display 24 are inserted into the insertion slots 18 of each connection base 16 to achieve electric connection between the displays 24 and the flat cable 14, hence allowing data transmission via the transmission lines 12. However, with this design, the connection bases 16 are disposed on the flat cable 14 in advance, the flat cable 14 is installed in the transversally U-shaped frame 20, and the displays 24 are then connected with the connection bases 16. The assembly process is very cumbersome and inconvenient. Moreover, advance positioning of the connection bases 16 will limit the positions of the displays 24 on the transversally U-shaped frame 20, hence reducing the flexibility of using the displays 24.

Accordingly, the present invention provides an easy to assemble and install and efficient to use electronic display to resolve the problems in the prior art.

SUMMARY OF THE INVENTION

The object of the present invention is to provide an electronic display, wherein a two-wired conducting strip is installed in a fixing beam, two magnetic connectors are at the rear side of a display so that the display can achieve electric connection through adhesive contact of the magnetic connectors with the two-wired conducting strip, therefore the installation process is simple. Another object of the present invention is to provide flexible installation of the electronic display, which can be arbitrarily positioned on a fixing beam.

According to the present invention, an electronic display comprises a fixing beam with a two-wired conducting strip installed in a groove thereof. Two terminal-fixing bases to fix the two-wired conducting strip and electric cables are provided at two ends of the two-wired conducting strip, respectively. At least one display is installed on the fixing beam. Two magnetic connectors are disposed at the back side of the display so that the display can achieve electrical connection through adhesive contact of the magnetic connectors with the two-wired conducting strip, thereby providing the required electricity and communications for the electronic display.

The various objects and advantages of the present invention will be more readily understood from the following detailed descriptions when read in conjunction with the appended drawings, in which:

DETAILED DESCRIPTION OF THE PREFERRED EMBODIMENTS

Figure 1:
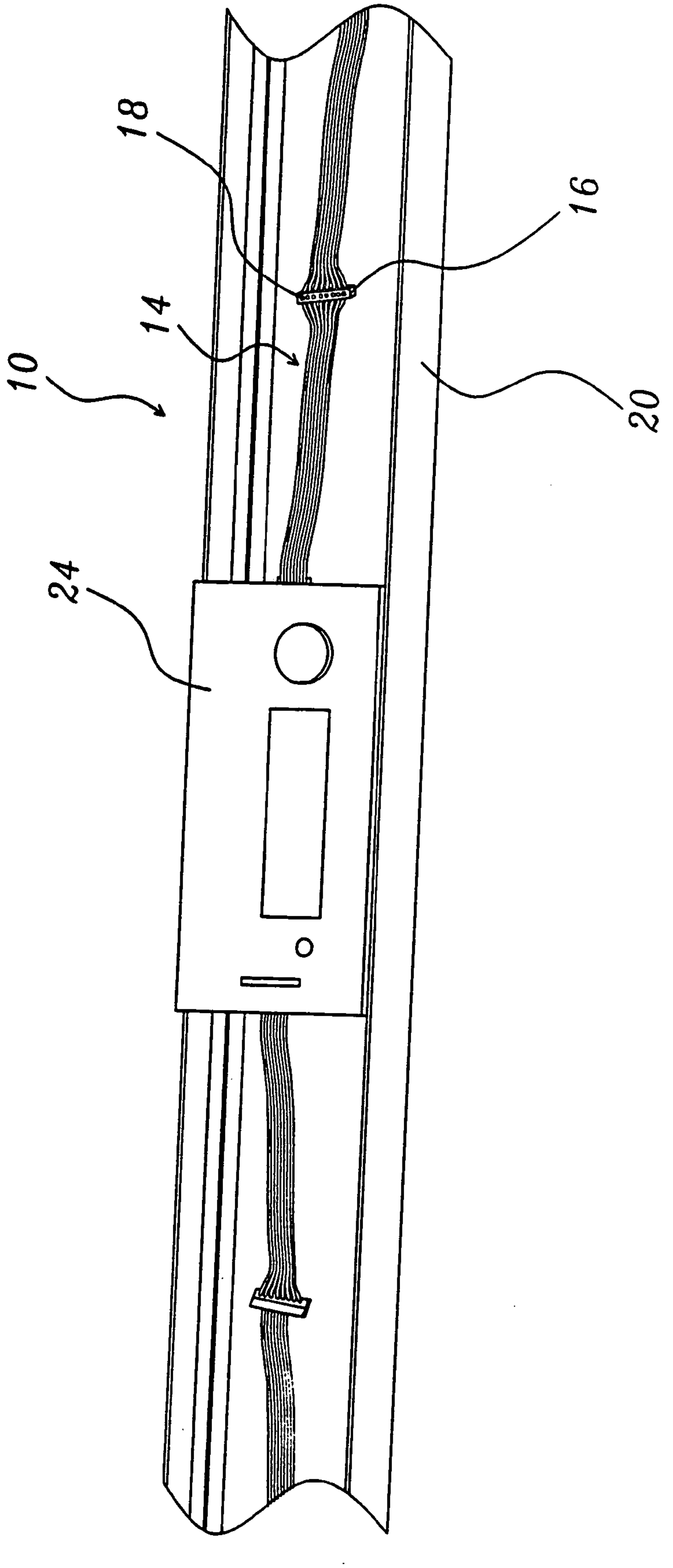
Fig. 1 PRIOR ART
FIG. 1 is an installation structure diagram of a conventional display.
Figure 2:
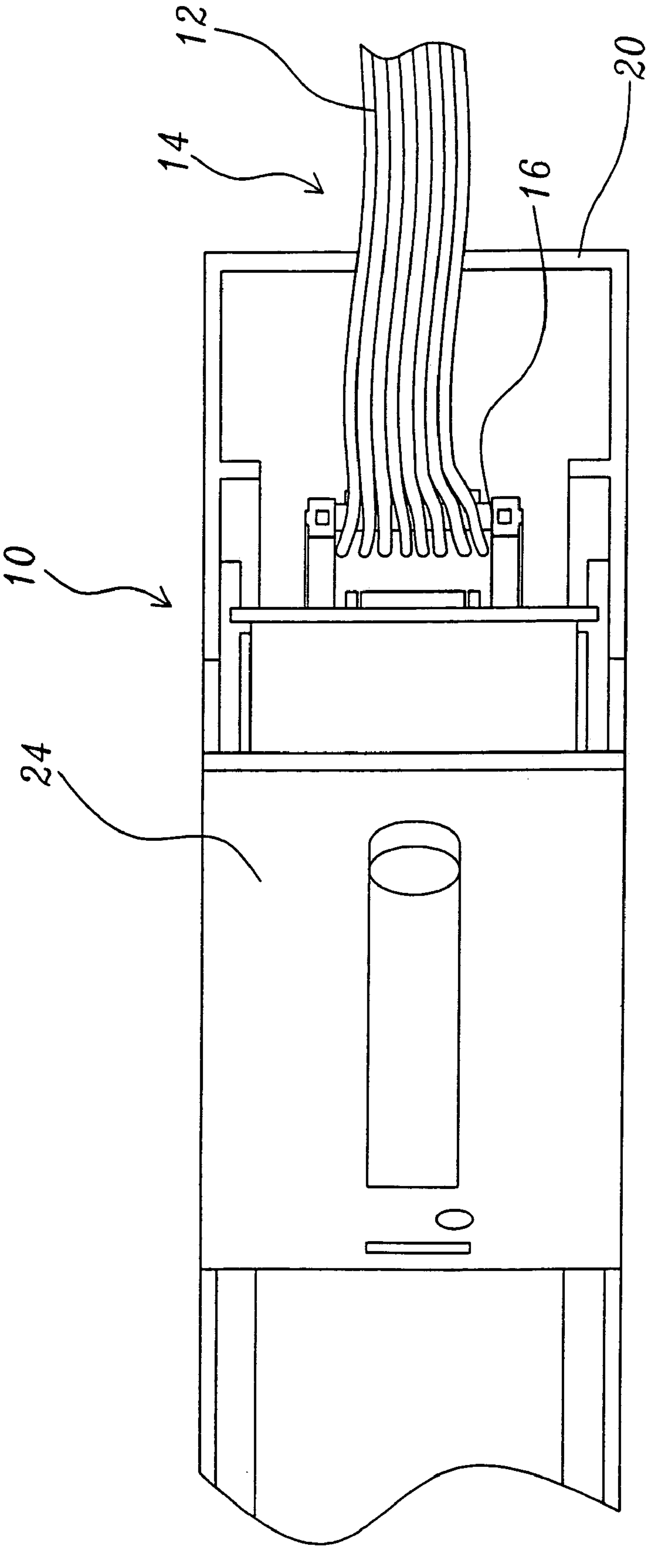
Fig. 2 PRIOR ART
FIG. 2 is a diagram showing the connection of a flat cable of FIG. 1.
Figure 3:
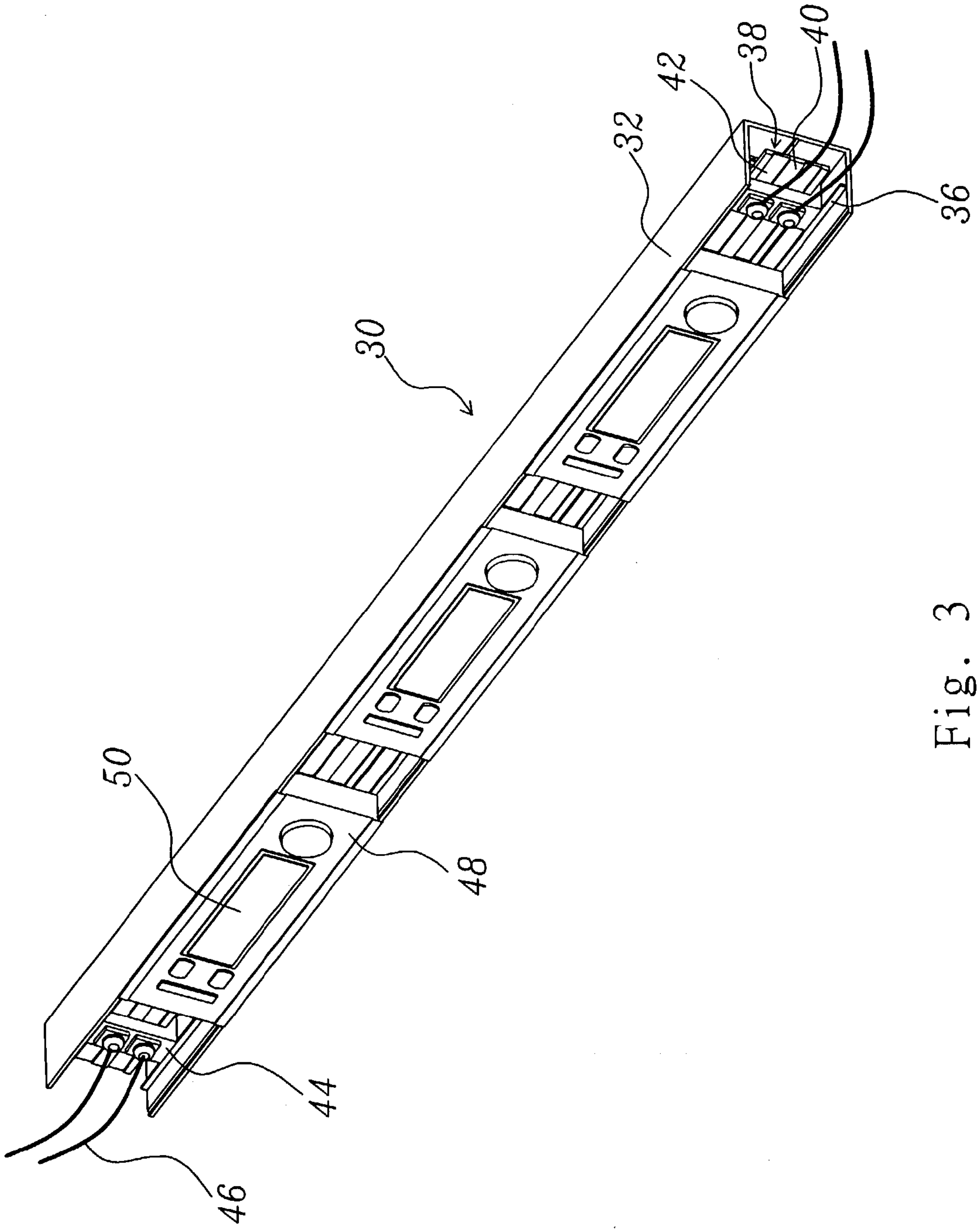
FIG. 3 is a perspective view of the present invention.
Figure 4:
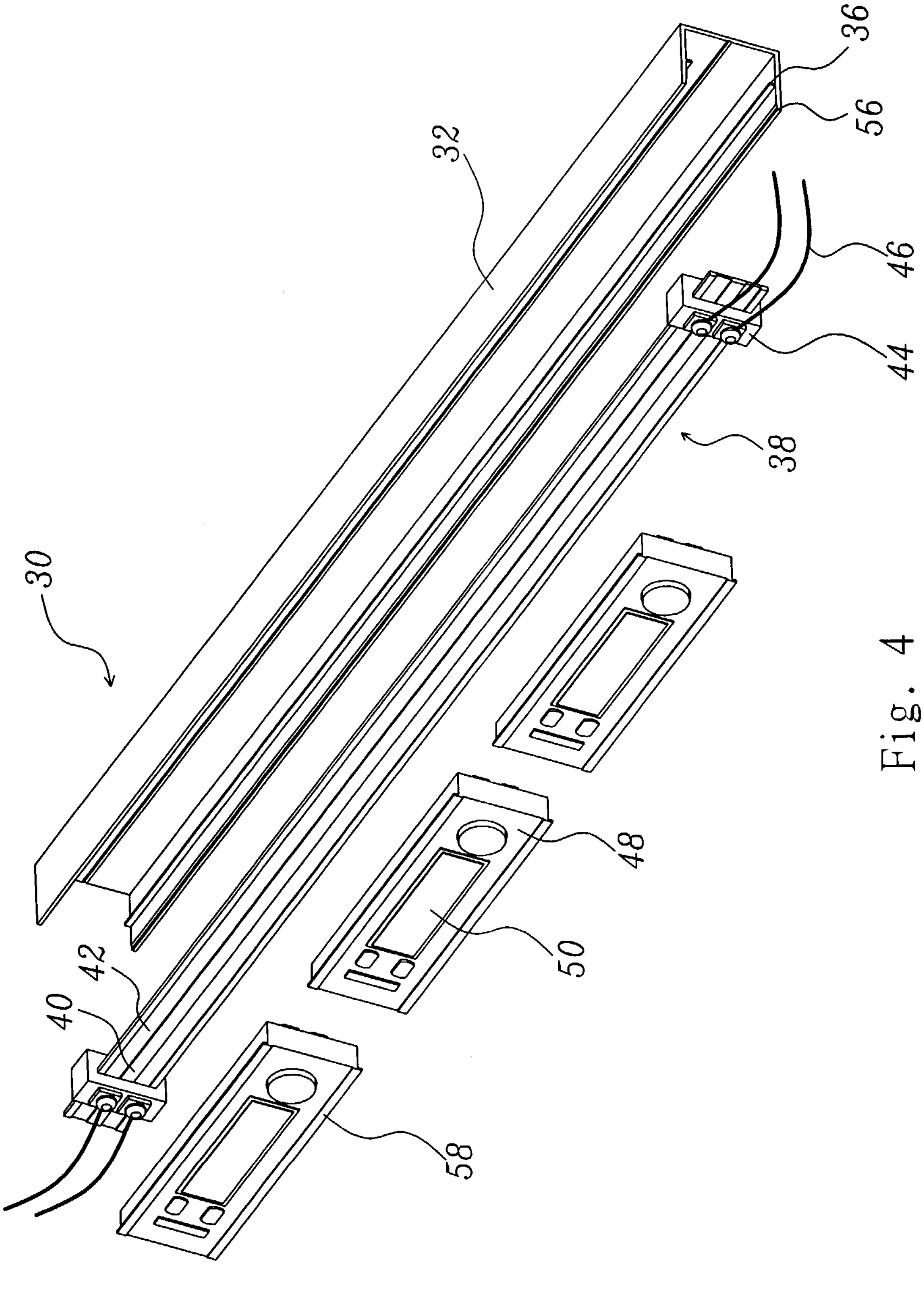
FIG. 4 is an exploded perspective view of the present invention.
Figure 5:
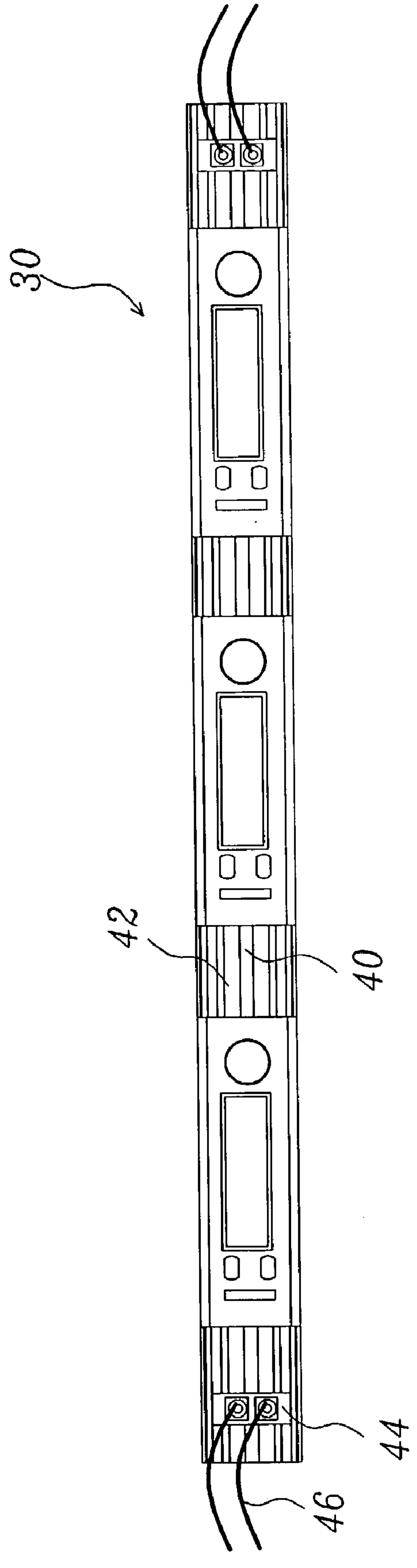
FIG. 5 is a front view of the present invention.
Figure 6:
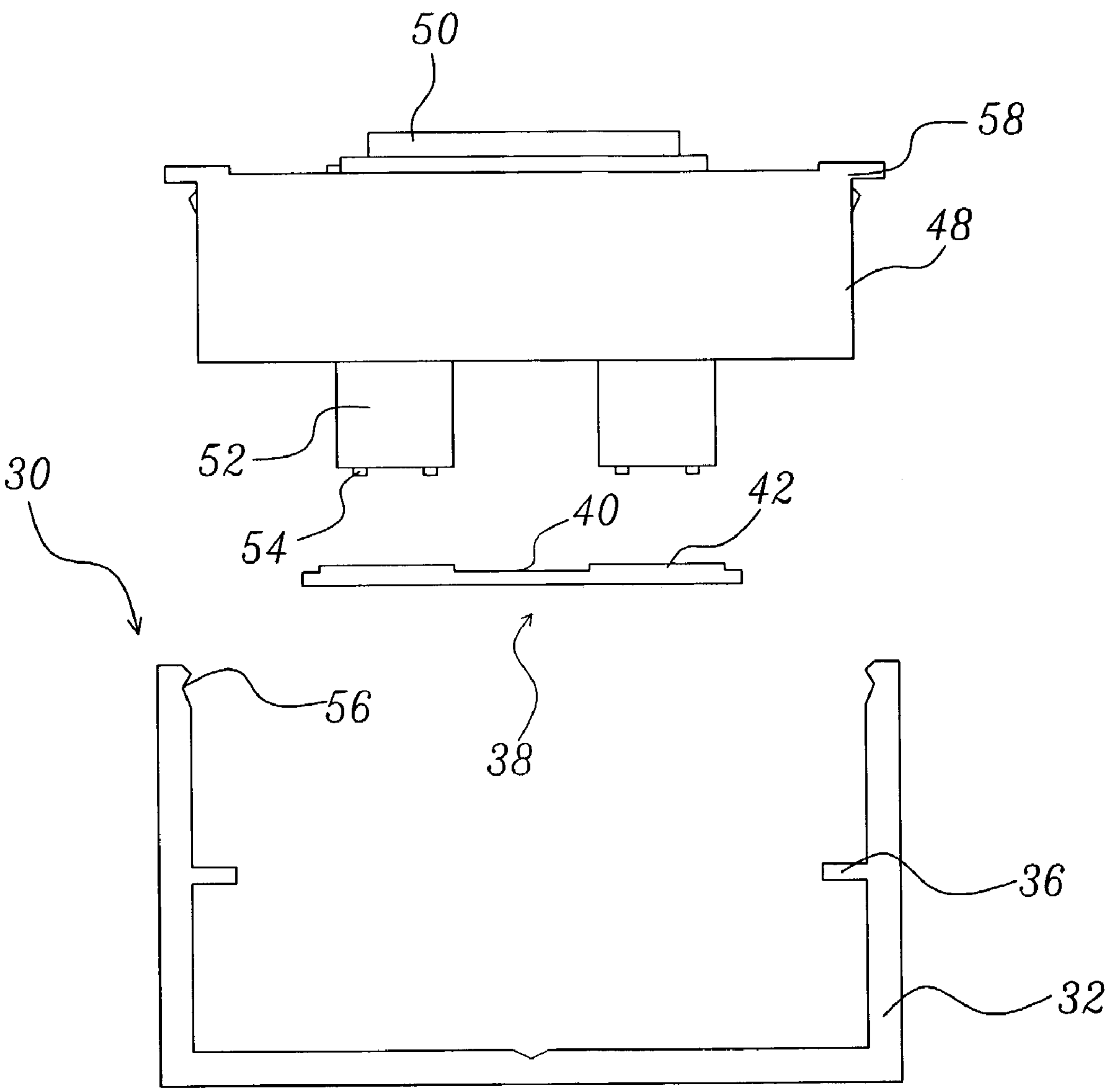
FIG. 6 is an exploded side cross-sectional view of the present invention.
Figure 7:
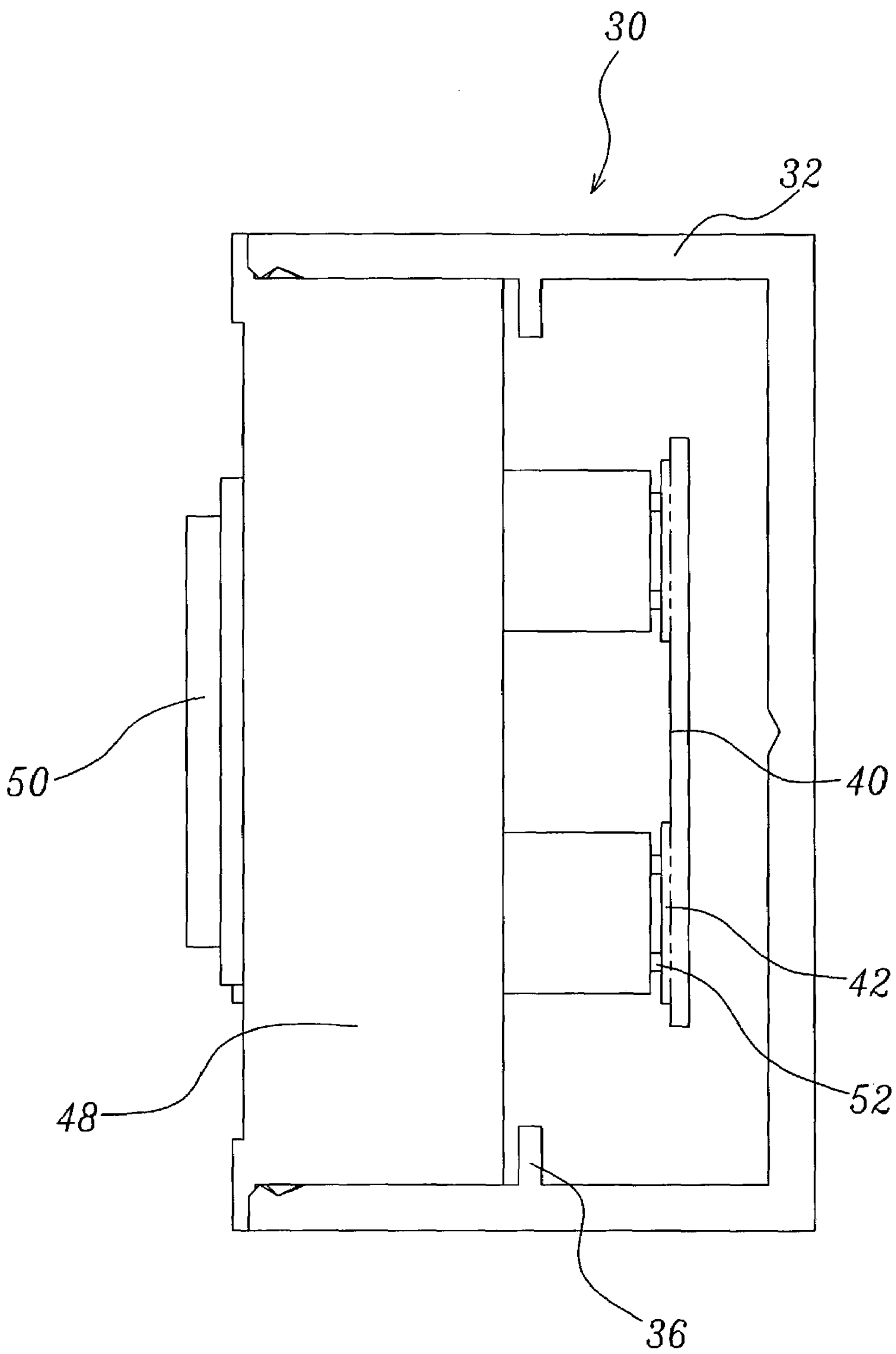
FIG. 7 is a side cross-sectional view of the present invention.

As shown in FIGS. 3, 4 and 5, an electronic display 30 comprises a transversally U-shaped fixing beam 32. Two parallel abutting pieces 36 are disposed at predetermined positions on two opposed inner sidewalls of the fixing beam 36, respectively. A two-wired conducting strip 38 is formed by placing two parallel conducting strips 42 on the adsorption area of a flat cover strip 40, for example, a stainless steel strip having electric and magnetic conduction effects can be used. Two terminal-fixing bases 44 are disposed at both ends of the two-wired conducting strip 38 respectively to fix the two-wired conducting strip 38 at the inner side of the fixing beam 32. Each terminal-fixing base 44 can connect an electric cable 46 with the conducting strip 42. The electric cable 46 is extended to another two-wired conducting strip or computer control system (not shown). A plurality of displays 48 are attached to the fixing beam 32. Rear ends of both sides of each display 48 abut against the abutting pieces 36. As shown in FIGS. 6 and 7, the front side of each display 48 has a display panel 50, two magnetic connectors 52 are disposed on the back side of each display 48. Contacts of the magnetic connectors 52 correspond to the conducting strip 42. Two magnetic conducting contacts 54 are disposed on an adsorption area of each magnetic connector 52. When the display 48 is attached to the fixing beam 32, the magnetic conducting contacts are magnetically attracted or adsorbed to the conducting strip 42 to achieve electric connection, hence providing the required electricity and signals for the display 48 via the magnetic connectors 52.

The cover strip 40 is a plastic cover strip having flexibility so that the two conducting strips 42 can be covered and fixed by the plastic cover strip. Parallel concave tracks 56 are disposed at open-end edges of two opposed sidewalls of the fixing beam 32, respectively, as shown in FIG. 6. Flanges 58 are disposed at two side faces of each display 48, respectively. When the display 48 is disposed on the fixing beam 32, the. flanges 58 will be locked in the concave tracks 56 to accomplish the effect of locking the display 48 to the fixing beam 32.

In the present invention, when installing a plurality of displays 48, it only needs to connect the magnetic connectors 52 of each display 48 to the conducting strip 42. The two-wired conducting strip 38 can thus be used as a transmission medium of electricity and display signals. The installation is very simple. Moreover, for the cable layout, it only needs to connect the terminal-fixing bases 44 disposed at the both ends of each conducting strip 42 to a computer control system via an electric cable 46 to receive signals from the computer control system. Compared with the prior art, the present invention not only can improve the installation by reducing the complexity of the display, but also the position of the display on the fixing beam can be freely adjusted. Therefore, the drawback of inflexibility of the display in the prior art can be overcome.

Besides, because the cover strip of the present invention has flexibility, when the electronic display is impacted by an external force to deform and bend the fixing beam, the two-wired conducting strip adhering to the display will deform accordingly thus won't cause power failure due to distortion. Therefore, the display can continue working normally.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

We claim:

1. An electronic display comprising:

a longitudinally extended fixing beam;

a two-wired conducting strip disposed in said fixing beam, two terminal-fixing bases for fixing said two-wired conducting strip and connected electric cables being provided at two ends of said two-wired conducting strip, respectively, said two-wired conducting strip being retained by said terminal fixing bases to extend longitudinally therebetween in at least partially suspended manner; and at least a display with two magnetic connectors arranged at a back face thereof, said display attractively adhering said two-wired conducting strip through said magnetic connectors magnetically engaging said two-wired conducting strip to achieve electric connection therewith.

2. The electronic display as claimed in claim 1, wherein said two-wired conducting strip is formed by embedding and fixing two parallel conducting strips into a cover strip to form a conducting adhesive face, and said two parallel conducting strips corresponds to contacts of said magnetic connectors.

3. The electronic display as claimed in claim 2, wherein said two parallel conducting strips are made of stainless steel having magnetic conduction effect.

4. The electronic display as claimed in claim 2, wherein said cover strip is a strip roll formed by extrusion of plastics, and is used to cover and fix said two parallel conducting strips so that said two-wired conducting strip can be wound in a roll for storage.

5. The electronic display as claimed in claim 1, wherein at least a magnetic conducting contact is disposed at an adhesive face of each of said magnetic connectors.

6. The electronic display as claimed in claim 1, wherein two parallel abutting pieces are disposed at two opposed sidewalls of said fixing beam, respectively, for locking said display when said display is embedded into said fixing beam.

7. The electronic display as claimed in claim 1, wherein two parallel concave tracks are disposed at open-end edges of two opposed sidewalls of said fixing beam, respectively, and two flanges corresponding to said two concave tracks to be locked with said concave tracks are disposed at front ends of two sidewalls of said display, respectively.

8. The electronic display as claimed in claim 1, wherein said two-wired conducting strip is retained by said terminal fixing bases to be disposed in spaced manner from said fixing beam.

* * * * *